United States Patent [19]

Wyllie

[11] Patent Number: 4,914,976
[45] Date of Patent: Apr. 10, 1990

[54] FIVE AND SIX DEGREE OF FREEDOM HAND CONTROLLERS

[75] Inventor: Charles E. Wyllie, Largo, Fla.

[73] Assignee: Honeywell Inc., Minneapolis, Minn.

[21] Appl. No.: 181,398

[22] Filed: Apr. 13, 1988

[51] Int. Cl.⁴ .......................... G05G 1/00; G05G 1/04; B64C 13/04

[52] U.S. Cl. ........................................ 74/523; 74/491; 244/237; 416/114

[58] Field of Search ...................... 74/523, 515 E, 491; 244/236, 237; 180/315, 316, 333, 334; 416/114

[56] References Cited

U.S. PATENT DOCUMENTS

| | | | |
|---|---|---|---|
| 2,523,262 | 9/1950 | Amtmann | 244/237 X |
| 3,028,126 | 4/1962 | Holleman | 244/236 |
| 4,040,499 | 8/1977 | Kestian et al. | 180/333 X |
| 4,420,808 | 12/1983 | Diamond et al. | 364/434 |
| 4,477,043 | 10/1984 | Repperger | 244/223 |
| 4,491,325 | 1/1985 | Bersheim | 74/523 X |
| 4,555,960 | 12/1985 | King | 74/523 X |

Primary Examiner—Leslie A. Braun
Assistant Examiner—Janice E. Chartoff
Attorney, Agent, or Firm—Kinney & Lange

[57] ABSTRACT

A five or six degree of freedom device which includes a two or three degree of freedom wrist action hand controller and in which additional degrees of freedom are provided by motion of an operator's forearm connected to a mounting member that carries or supports the wrist action hand controller.

36 Claims, 1 Drawing Sheet

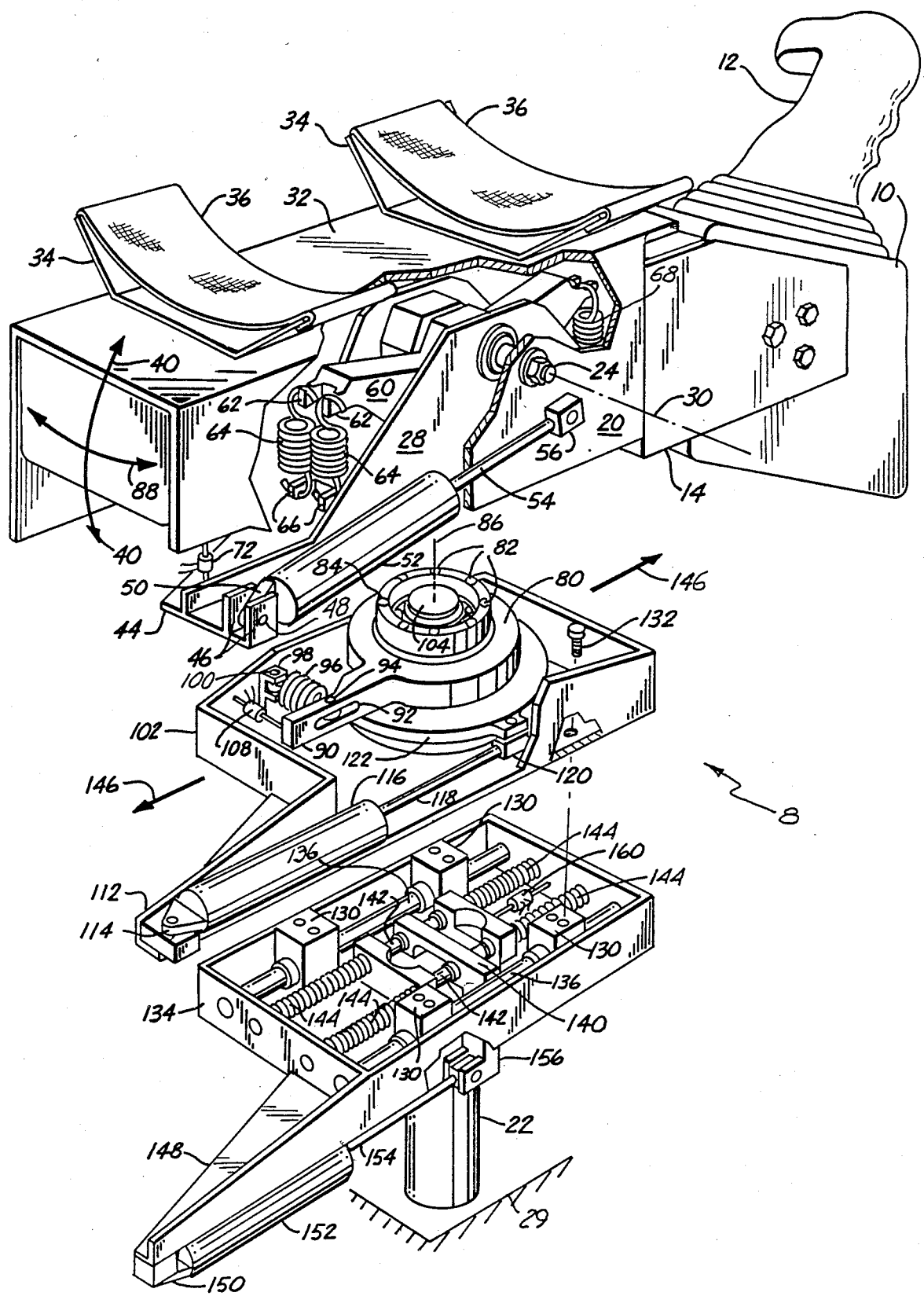

4,914,976

FIVE AND SIX DEGREE OF FREEDOM HAND CONTROLLERS

BACKGROUND OF THE INVENTION

1. Field of the Invention.

The present invention relates to hand controllers and, more particularly, to hand operated controllers for operating remote systems such as the flight control systems in aircraft, spacecraft or motion and effector control of robotics or land vehicle mechanisms.

2. Description of the Prior Art.

Two and three degree of freedom hand control (command) systems are well known in the art. Such control systems have commonly been devised utilizing a control knob or handle, often shaped to fit the operator's hand, so that he can move it, for example in a three degree of freedom system, forwardly and backwardly to control the pitch of an aircraft, to the right and left to control the roll of the craft, and to twist it about a vertical axis to control the yaw of the aircraft. In some applications, as for example in helicopter control, a fourth command axis is needed to control the up and down motion, i.e. the collective motion of the craft. The collective control has heretofore been accomplished either by use of a separate dedicated controller or by adding a fourth axis to a three axis (roll, pitch, yaw) hand controller so that the operator lifts the control knob or handle vertically or pushes it downwardly to produce the desired collective control.

In a co-pending application Ser. No. 181.062, filed on even date herewith entitled "Three and Four Degree of Freedom Hand Controller" and assigned to the assignee of the present invention, there is described a system where the fourth axis is controlled by motion of the forearm rather than by hand-wrist motion. This is quite satisfactory for four degrees of freedom, but it is sometimes desirable to have more than four degrees of freedom as, for example, in controlling a space, air or ground vehicle, manipulator arms, or robotics devices where five or six degrees of control may be required. While two three degree of freedom hand controls, one for each hand, may be used, this prevents use of one hand for other efforts and may be confusing to the operator. Accordingly, it is desired to provide five and six degrees of command requiring use of only one of the operator's forearms.

SUMMARY OF THE INVENTION

The present invention expands the four degree of freedom controller of the above-mentioned co-pending application to provide fifth and sixth degree of freedom commands through additional motions of the forearm controller, e.g. right-left and fore-aft. More particularly, the usual two or three degree of freedom hand controller of the prior art is mounted on a movable member which is moved/controlled the operator's forearm. The operator commands three degrees of freedom by motions of his hand-wrist in the same manner as is heretofore used in conventional two or three axis controllers. The fourth axis (degree of freedom) is provided by motion of the forearm as set forth in the above-mentioned co-pending application as, for example, by a pivoting motion of the forearm in a near vertical plane about a horizontal axis at some location between the wrist and elbow projections so as to control an up-down command motion. In the present invention, the controller armrest is arranged to also pivot about a near vertical axis for right-left fifth degree command motion. As used herein, "horizontal" and "vertical" are relative terms generally referenced to a cockpit or control station structure, not necessarily referenced to earth. For the sixth degree of freedom command, forward and aft motion of the armrest is provided. As the operator moves his forearm to create the fourth, fifth and sixth axes commands, the three axis hand controller travels with the motion without effecting hand-wrist motion of the operator. Conversely, three axis hand-wrist command motions can be accomplished without effecting the forearm controlled fourth, fifth and sixth axes. Consequently, six axes (degrees of freedom) can be independently controlled with ease and without cross coupling.

BRIEF DESCRIPTION OF THE DRAWINGS

FIG. 1 a perspective and partially cut away view of the six degree of freedom hand controller of the present invention.

DETAILED DESCRIPTION OF THE PREFERRED EMBODIMENTS

In FIG. 1, a control system 8 is shown to include a three degree of freedom rotational hand controller 10, having a hand grip 12, and is shown mounted to a support bracket 14 which is fixedly attached to an arm support 20. Controller 10 may be any suitable two or three axis rotational controller of the prior art, as for example the Honeywell three degree of freedom hand controller used on the space shuttle Orbiter, and need not be further described herein.

To provide for fourth, fifth and sixth axes control as, for example, up-down, right-left and fore-aft, the present invention utilizes a forearm controller to provide three additional uncoupled command motions independent of those of the hand-wrist controller portion. To accomplish this, forearm support 20, which carries the three axis controller 10 with it, is rotatably mounted with respect to a support pedestal 22 by a bolt 24 pivotally mounted in a bearing 26 attached to a fixed member 28 connected to pedestal 22 through right-left and fore-aft apparatus to be hereinafter described. Pedestal 22 may be part of a chair in which the operator sits or otherwise be attached to the craft as shown by hatch lines 29. By this arrangement, arm support 20 may move about an axis 30 through bearing 26 and with such motion carry with it the two or three degree of freedom hand controller 10. Support 20 has an upper surface 32 upon which a pair of brackets 34 are mounted, each of which carries a support strap 36. The operator's forearm is cradled or constrained in position by formed supports 36 and 34 so that his forearm motion, as for example in a direction shown by arrow 40, will produce rotary motion of support member 20 with respect to fixed member 28 about axis 30. Axis 30 is seen to be generally perpendicular to the operator's forearm centerline, although spaced therebelow. Axis 30 will be easily arranged to provide optimum spacing above, at or below the operator's forearm dependent on each system application.

Member 28 has a rearwardly and slightly downwardly extending flange 44 which carries a pair of upward extensions 46 through which a pin 48 is inserted to hold an end 50 of a damper member 52. Damper 52 includes a rod 54 which is mounted to arm support 20 by a pivotal device 56. Damper 52 provides damping for the relative motion between support member 20 and fixed member 28.

A biasing member 60, which is driven by arm support 20, has a pair of extensions 62 which carry a pair of tension springs 64, the other ends of which are connected to a pair of extensions 66 fixedly attached to member 28. Similar springs 68, only partially visible in the figure, are connected between the other end of bias member 60 and fixed member 28. The purpose of springs 64 and 68 is to provide tension on the arm support 20, to give the operator proprioceptive force feedback for motions about axis 30, and to provide a centering force for support 20 with respect to fixed member 28. The command motion of support 20 with respect to member 28 can be detected in any number of ways as, for example, a linear variable differential transformer 72, one end of which is connected to the left end of support member 20 and the other end of which is attached to the flange 44 of member 28. Of course, other types of pick-offs may be employed such as potentiometers or rotary variable differential transformers. The output of transformer 72 supplies the command signal for use in control of a function in this axis.

All of the above description is included in the above-mentioned co-pending application. To supply fifth and sixth degrees of freedom in accordance with the present invention, apparatus shown below the above-described up and down controller is shown in the figure. More particularly, fixed member 28 is mounted to a bearing member 80 by a plurality of bolts (not shown) engagable with a plurality of interiorly threaded apertures 82 in an upwardly extending portion 84 of bearing member 80 so that the up-down controller described above may rotate about an axis 86 in a direction shown by arrow 88.

Bearing member 80 has a lateral extension 90 containing a slot 92 through which a pin 94 is inserted to engage a spring 96, the other end of which is connected to a bracket 98 by a pin 100. Bracket 98 is fixedly attached to a housing 102 which carries a vertical shaft 104 lying along axis 86 and about which bearing member 80 rotates. A spring similar to spring 96 (not shown) extends from bearing member 80 on the opposite side from spring 96. As with springs 64 above, spring 96 and its counterpart operate to provide force feedback for the motions about axis 86 and to provide a centering force for the bearing member 80. The motion of bearing member 80 with respect to housing 102 can be detected in any convenient manner as, for example, a linear variable differential transformer 108 one side of which is connected to extension 90 of bearing member 80 and the other side of which is connected to housing 102.

Housing 102 has a lateral extension 112 which is shown attached to a first end 114 of a damper 116 which carries a rod 118 pivotally connected by a member 120 to a lower portion 122 of bearing member 80. Like damper 52 above described, damper 116 provides damping for the relative motion between bearing member 80 and housing 102. It is seen that as the operator's forearm moves to the right and left in the figure, bearing member 80 will move with respect to housing 102 and thus produce an output from transformer 108 which may be used to supply a signal to control the right-left axis of a vehicle or mechanism. It is also seen that such motions are accompanied by the up-down controller and thus the hand controller 10 without cross coupling.

To supply fore and aft command, housing 102 is connected to a plurality of supports 130 as, for example, by bolts 132 one of which is shown in the figure. Supports 130 are movable within a fixed housing 134 along shafts 136. An interior member 140, driven by pins (not shown) in housing 102 and movable therewith along shafts 142, is shown bearing against a plurality of spring members 144 each of which extends between the interior member 140 and the housing 134. As with springs 96 and 64 above, springs 144 operate to provide force feedback for motions of mounting members 130 with respect to the housing 134. Such motions are in directions shown by arrows 146 and since supports 130 carry the apparatus shown above them in the figure, the hand controller 10 is moved in accompaniment without cross coupling.

Housing 134 has a lateral extension 148 which is shown connected to an end 150 of a damper 152 which carries a rod 154 connected to an extension 156 connected to the members 130. Like the dampers 116 and 52, damper 152 operates to provide damping for the relative motion between support members 130 and housing 134. The motion of support members 130 and the apparatus lying thereabove with respect to housing 134 may be detected in a number of ways as, for example, a linear variable differential transformer 160 having one end connected to the interior member 140 and the other end connected to housing 134. Housing 134 is fixedly connected to support 22 which, as described above, may be a portion of the operator's chair or may be otherwise attached to the craft as shown by the hatch lines 29.

In operation, the hand controller 10 is used to provide two or three axis rotation control commands such as for aircraft pitch, roll and yaw axes in the same manner as it is normally used. The hand controller 10 is connected to the rotatable housing 20 and motion of the operator's forearm about the axis 30 is used as an up-down command motion according to the output from transformer 72. With the present invention, the above-described apparatus is all rotatable about axis 86 and, accordingly, right and left motion can be commanded in accordance with the output produced by transformer 108. Further in accordance with the present invention, all of the above-described apparatus is movable fore and aft with respect to housing 134 connected to shaft 22 and, accordingly, fore and aft motion represents operator command in accordance with the output from transformer 160. All of the fourth, fifth and sixth degree motions are accomplished while the hand controller 10 is carried along so that signals for controlling the fourth, fifth and sixth degree motions of the craft can be produced without cross coupling with the hand-wrist signal motions of the hand controller 10.

It is therefore seen that I have provided a six degree of freedom hand controller in which the fourth, fifth and sixth degrees of freedom are provided by forearm motions of the operator without disturbing the operation of the three degree of freedom hand controller known in the prior art. As used herein, "horizontal" and "vertical" are relative terms generally referenced to a cockpit or control station structure, not necessarily referenced to earth. Many applications of this invention to control five or six variables will occur to those skilled in the art.

Accordingly, although the present invention has been described with reference to an initial, developmental embodiment, workers skilled in the art will recognize that changes may be made in form and detail without departing from the spirit and scope of the invention.

What is claimed is:

1. Apparatus for use with a wrist motion hand controller comprising:
   stationary means;
   arm support means fixedly connected to the hand controller and mounted for movement with respect to the stationary means;
   first relative movement responsive means connected to the stationary means and to the arm support means to produce a first output indicative of a first movement between the arm support means and the stationary means; and
   second relative movement responsive means connected to the arm support means to produce a second output indicative of a second movement between the arm support means and the stationary means.

2. Apparatus according to claim 1 wherein the arm support means includes holding means adapted to accommodate an operator's forearm on the arm support means so that the operator's hand may operate the hand controller and the operator's forearm may produce the first and second movements independently of any wrist motion of the operator.

3. Apparatus according to claim 2 wherein the wrist motion hand controller is a three degree of freedom device for producing first, second and third control signals, the first output provides a fourth control signal and the second output means provides a fifth control signal.

4. Apparatus according to claim 3 wherein the apparatus is mounted in a control station and the first, second, third, fourth and fifth control signals are used to control remote system.

5. Apparatus according to claim 4 wherein the first, second, third, fourth and fifth control signals control the remote systems in pitch, roll and yaw, and two of the up-down, right-left and fore-aft axes, respectively.

6. Apparatus according to claim 1 wherein the arm support means includes a first member connected to the hand controller, a second member connected to the first member and a third member connected to the stationary means, the first member being movable with respect to the second member and the second member being movable with respect to the third member.

7. Apparatus according to claim 6 wherein the first movement comprises motion between the first and second members and the second movement comprises motion between the second and third members and wherein the first relative movement responsive means includes a first transducer operable to produce the first output in accordance with the first movement and the second relative movement responsive means includes a second transducer operable to produce the second output in accordance with the second movement.

8. Apparatus according to claim 7 wherein the arm support means includes holding means adapted to accommodate an operator's forearm on the support means so that the operator's hand may operate the hand controller and the operator's forearm may produce the first and second movements independently of any wrist motion of the operator.

9. Apparatus according to claim 8 wherein the wrist motion hand controller is a three degree of freedom device for producing first, second and third control signals, the first output provides a fourth control signal and the second output provides a fifth control signal.

10. Apparatus according to claim 9 wherein the apparatus is mounted in a vehicle and the first, second, third, fourth and fifth control signals are used to control the vehicle with respect to five different axes.

11. Apparatus for use with a wrist motion hand controller comprising:
    stationary means;
    arm support means fixedly connected to the hand controller and mounted for movement with respect to the stationary means;
    first relative movement responsive means connected to the stationary means and to the arm support means to produce a first output indicative of a first movement between the arm support means and the stationary means;
    second relative movement responsive means connected to the stationary means and to the arm support means to produce a second output indicative of a second movement between the arm support means and the stationary means; and
    third relative movement responsive means connected to the stationary means and to the arm support means to produce a third output indicative of a third movement between the arm support means and the stationary means.

12. Apparatus according to claim 11 wherein the arm support means includes holding means adapted to accommodate an operator's forearm on the arm support means so that the operator's hand may operate the hand controller and the operator's forearm may produce the first, second and third movements independently of any wrist motion of the operator.

13. Apparatus according to claim 12 wherein the wrist motion hand controller is a three degree of freedom device for producing first, second and third control signals, the first output provides a fourth control signal, the second output produces a fifth control signal and the third output provides a sixth control signal.

14. Apparatus according to claim 13 wherein the apparatus is mounted in a control station and the first, second, third, fourth, fifth and sixth, control signals are used to control remote systems with respect to six different axes.

15. Apparatus according to claim 14 wherein the first, second, third, fourth, fifth and sixth command signals control the remote systems in any combination of six degrees of freedom.

16. Apparatus according to claim 11 wherein the arm support means includes a first member connected to the hand controller, a second member connected to the first member, a third member connected to the second member and a fourth member connected to the stationary member, the first member being movable with respect to the second member, the second member being movable with respect to the third member and the third member being movable with respect to the fourth member.

17. Apparatus according to claim 16 wherein the first movement comprises motion between the first and second members, the second movement comprises motion between the second and third members, and the third movement comprises motion between the third and fourth members, and the first relative movement responsive means includes a first transducer operable to produce the first output in accordance with the first movement, the second relative movement responsive means includes a second transducer operable to produce the second output in accordance with the second movement and the third relative movement responsive means includes a third transducer operable to produce the third output in accordance with the third movement.

18. Apparatus according to claim 17 wherein the arm support means includes holding means adapted to accommodate an operator's forearm on the support means so that the operator's hand may operate the hand controller and the operator's forearm may produce the first, second and third movements independently of any wrist motion of the operator.

19. Apparatus according to claim 18 wherein the wrist motion hand controller is a three degree of freedom device for producing first, second and third control signals, the first output provides a fourth control signal, the second output provides a fifth control signal and the third output provides a sixth control signal.

20. Apparatus according to claim 19 wherein the apparatus is mounted in a control station and the first, second, third, fourth, fifth and sixth control signals are used to control remote systems in six different axes.

21. The method of producing at least five individual control signals with motions of an operator's hand-wrist and forearm comprising the steps of:
 (A) producing first, second and third signals utilizing three separate motions of the operator's hand-wrist; and
 (B) producing fourth and fifth signals utilizing first and second motions of the operator's forearm, the fourth and fifth signals capable of being produced without affecting the first, second and third signals.

22. The method of claim 21 wherein step A is accomplished with a three degree of freedom hand controller.

23. The method of claim 21 wherein step B is accomplished with a movable member controlled by the operator's forearm.

24. The method of claim 23 wherein step A is accomplished with a three degree of freedom hand controller attached to the movable member.

25. The method of claim 24 further including the step:
 (C) producing the fourth and fifth signals in accordance with fourth and fifth independent motions of the movable member.

26. The method of claim 25 wherein step C includes steps:
 (1) producing the fourth signal in accordance with motion of the movable member with respect to a first axis; and
 (2) producing the fifth signal in accordance with motion of the movable member with respect to a second axis.

27. The method of claim 26 wherein the first and second axes lie in approximately perpendicular planes.

28. The method of producing at least six individual independent control signals with motions of an operator's hand and forearm comprising the steps of:
 (A) producing first, second and third signals utilizing three separate motions of the operator's hand-wrist; and
 (B) producing fourth, fifth and sixth signals utilizing first, second and third motions of the operator's forearm, the fourth, fifth and sixth signals capable of being produced without affecting the first, second and third signals.

29. The method of claim 28 wherein step A is accomplished with a three degree of freedom hand controller and step B is accomplished with a movable member controlled by the operator's forearm.

30. The method of claim 29 further including the step:
 (C) producing the fourth, fifth and sixth signals in accordance with fourth, fifth and sixth independent motions of the movable member.

31. The method of claim 30 wherein step C includes steps:
 (C1) producing the fourth signal in accordance with motion of the movable member with respect to a first axis;
 (C2) producing the fifth signal in accordance with motion of the movable member with respect to a second axis; and
 (C3) producing the sixth signal in accordance with motion of the movable member with respect to a sixth axis.

32. A six degree of freedom hand controller comprising:
 fixed support means;
 first movable means connected to the support means and operable to produce a first motion with respect thereto;
 second movable means connected to the first movable means and operable to produce a second motion with respect thereto; and
 third movable means connected to the second movable means and operable to produce a third motion with respect thereto, the third movable means adapted to accommodate an operator's forearm to produce the first, second and third motions and adapted to carry a three degree of freedom hand-wrist motion hand controller positioned for grasping by the operator's hand and operable to produce fourth, fifth and sixth motions with movement of the operator's wrist.

33. Apparatus according to claim 32 wherein one of the first, second and third motions is translational along a first axis.

34. Apparatus according to claim 33 wherein another of the first, second and third motions is rotation about a second axis.

35. Apparatus according to claim 34 wherein the last of the first, second and third motions is rotational about a third axis.

36. Apparatus according to claim 35 wherein each of the motions is operable to produce a corresponding command-control signal and the apparatus is mounted in a control station with the command signals being operable to control remote systems with respect to three different attitudes and three different directions.

* * * * *

UNITED STATES PATENT AND TRADEMARK OFFICE
CERTIFICATE OF CORRECTION

PATENT NO. : 4,914,976

DATED : April 10, 1990

INVENTOR(S) : Charles E. Wyllie

It is certified that error appears in the above-identified patent and that said Letters Patent is hereby corrected as shown below:

Column 5, line 33, delete "system" and insert --systems--.

Signed and Sealed this

Ninth Day of July, 1991

*Attest:*

HARRY F. MANBECK, JR.

*Attesting Officer*  *Commissioner of Patents and Trademarks*